United States Patent

Hirata et al.

Patent Number: 5,215,798
Date of Patent: Jun. 1, 1993

[54] OPTICAL RECORDING MEDIUM

[75] Inventors: Hideki Hirata; Toshifumi Tanaka, both of Miyota; Osamu Murakami, Saku, all of Japan

[73] Assignee: TDK Corporation, Tokyo, Japan

[21] Appl. No.: 827,642

[22] Filed: Jan. 29, 1992

[30] Foreign Application Priority Data

Jan. 31, 1991 [JP] Japan .................. 3-032016
Feb. 7, 1991 [JP] Japan .................. 3-039246

[51] Int. Cl.$^5$ .................. B32B 3/00
[52] U.S. Cl. .................. 428/64; 428/65; 428/411.1; 428/457; 428/913; 430/945; 346/76 L; 346/735.1
[58] Field of Search .......... 428/64, 65, 411.1, 457, 428/913; 430/905; 346/76 L, 135.1

[56] References Cited

U.S. PATENT DOCUMENTS

| 4,944,967 | 7/1990 | Yabe et al. ............ 427/393.5 |
| 4,994,354 | 2/1991 | Tiobana et al. .......... 428/65 |

FOREIGN PATENT DOCUMENTS

| 60-26024 | 2/1985 | Japan . |
| 60-168707 | 9/1985 | Japan . |
| 61-115912 | 6/1986 | Japan . |
| 61-120816 | 6/1986 | Japan . |
| 1-24826 | 1/1989 | Japan . |
| 2-257445 | 10/1990 | Japan . |
| 2-257452 | 10/1990 | Japan . |
| 3-223341 | 10/1991 | Japan . |

*Primary Examiner*—Patrick J. Ryan
*Assistant Examiner*—Elizabeth Evans
*Attorney, Agent, or Firm*—Watson, Cole, Grindle & Watson

[57] ABSTRACT

Optical recording media include substrates of a larger diameter formed by injection molding a copolymer of ethylene with a cyclic olefin. The media are adapted for high speed rotation with the benefits of a high output, high C/N, and low noise level. When a protective substrate of glass is attached to the polyolefin substrate such that the recording layer is inside, there is obtained a light-weight rigid disk which experiences minimal axial runouts and hence, minimal focusing errors during high rotational speed operation.

10 Claims, 5 Drawing Sheets

OPTICAL RECORDING MEDIUM

This invention relates to optical recording disks.

BACKGROUND OF THE INVENTION

Optical disks known in the art include rewritable optical disks of the magneto-optical, phase change, and other modes as well as write-once type optical recording disks. Most optical recording disks have a recording layer formed on a substrate, and are generally recorded and reproduced by directing a laser beam or similar light through the substrate. Therefore, the substrates used are formed of transparent materials, for example, glass and resins. For a weight reduction and ease of formation of tracking grooves and pits, conventional optical recording disks use resinous substrates with polymethyl methacrylate and polycarbonate being frequently employed.

Among them, polymethyl methacrylate has excellent optical properties including a low coefficient of optical elasticity and a very low birefringence, but is poor in dimensional stability due to high water absorption and low heat resistance.

Therefore, polycarbonates having low water absorption and relatively high heat resistance are used most often. However, the polycarbonates have a high coefficient of optical elasticity and often a high birefringence since their polymer chain tends to orient in a flow direction. For achieving a higher recording density and higher transfer rate, it was attempted in recent years to use disks of a larger diameter of at least 200 mm and carry out recording/reproducing operation at a high number of revolutions of at least 1,800 rpm. In such large diameter substrates, birefringence is incurred during injection molding of polycarbonate which is further increased through application of stresses during high speed rotation, resulting in a lowering of reproduced outputs. The polycarbonate is not fully low in water absorption so that large size substrates will undergo substantial distortion. Some lack of rigidity causes axial runouts and focus tracking errors during high rotational speed driving at 1,800 rpm or higher, especially at 3,000 rpm or higher. In addition, the low solvent resistance of polycarbonate is a problem when recording layers of the coating type are applied.

To meet the recent demand for high rotational speed driving at 1,800 rpm or higher, especially at 3,000 rpm or higher, substrates having higher mechanical strength should be used. Glass substrates have the high risk of failure when the disks are accidentally dropped or hit. Particularly when chemically tempered glass of high strength is used, it can fracture into scattering fragments. Glass substrates also have the problem that grooves useful as a pre-format information carrier cannot be formed.

To protect the recording layer from mechanical damage as by scratching, it is convenient to provide a protective plate on the recording layer or to mate a pair of substrates such that the recording layer is inside.

SUMMARY OF THE INVENTION

A primary object of the invention is to provide an optical recording disk using a resin substrate having improved dimensional stability and solvent resistance which ensures sufficient outputs and carrier-to-noise (C/N) ratio even when the disk of a large size is operated at a high rotational speed.

Another object of the invention is to provide an optical recording disk which ensures stable operation at a high number of revolutions without axial runouts or distortion and offers improved recording/reproducing characteristics and durability.

These and other objects are achieved by the present invention which in a first form provides an optical recording medium comprising a recording layer on a substrate having a diameter of at least 200 mm. Recording/reproducing operation is performed while rotating the medium at 1,800 rpm or higher. The substrate is formed of a resin composition comprising at least one cyclic polyolefin obtained by copolymerizing ethylene with a cyclic olefin of the general formula:

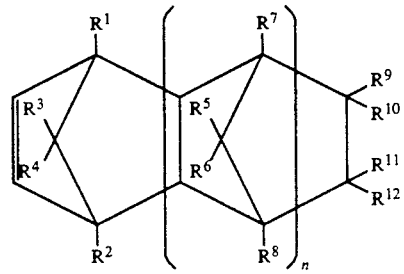

wherein n is 0 or a positive integer, $R^1$ through $R^{12}$ are independently selected from the group consisting of a hydrogen atom, halogen atom, and hydrocarbon group, and $R^9$ through $R^{12}$, taken together, may form a mono- or polycyclic group which may have a double bond, or $R^9$ and $R^{10}$ or $R^{11}$ and $R^{12}$ may form an alkylidene group.

In a second form, there is provided an optical recording disk comprising a pair of resin and glass substrates. The resin substrate has a recording layer thereon. The pair of substrates are mated into an integral disk such that the recording layer is inside, the glass substrate serving as a protective substrate. The resin substrate is formed of a resin composition as defined in the first form.

In preferred embodiments of the first and second forms, the substrate (resin substrate in the second form) is formed by injection molding the resin composition. The substrate includes a skin layer having a thermal softening point of up to about 140° C., especially about 100° to 140° C. under the surface thereof bearing the recording layer. In addition to the thermal softening point of the skin layer, the substrate has a secondary thermal softening point higher by at least 10° C. than the skin layer thermal softening point.

In the embodiment wherein the recording layer contains a dye, a reflective layer is provided on the recording layer.

The recording layer may be formed directly on the substrate. Alternatively, an undercoat layer lies between the substrate and the recording layer. The recording and undercoat layers each are formed by a vapor phase deposition method.

DETAILED DESCRIPTION OF THE INVENTION

Figure 1:
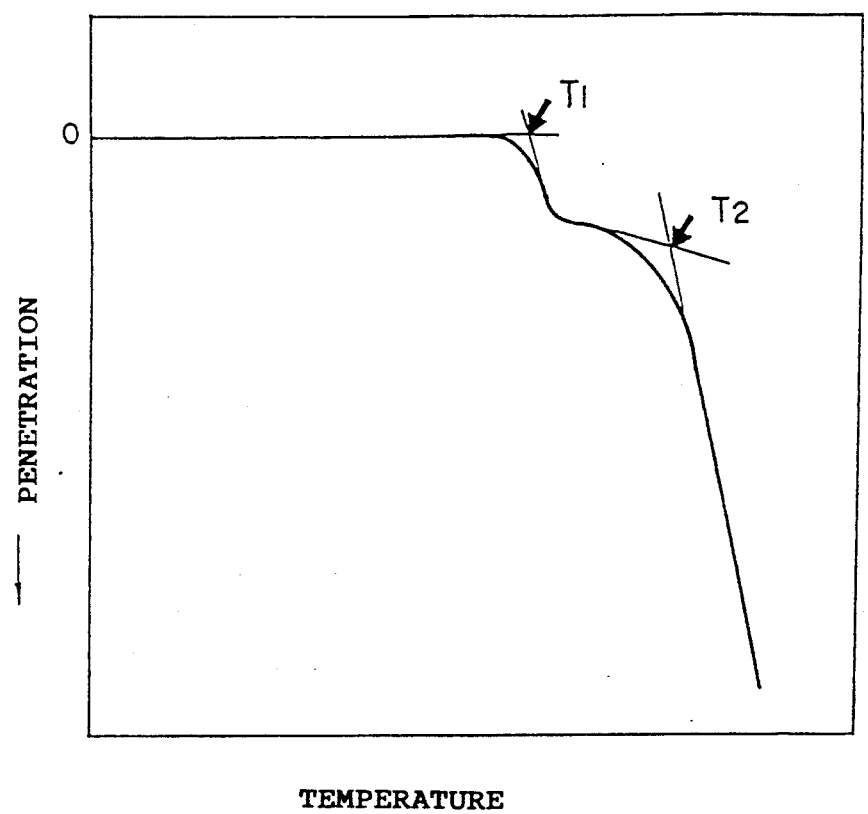
FIG. 1 is a graph plotting the penetration relative to temperature of a cyclic polyolefin substrate, illustrating the thermal softening point thereof.

The first form of the present invention having only a resin substrate is described.

Substrate

The substrates which are used to construct optical recording disks according to the present invention are formed of a resin composition comprising at least one cyclic polyolefin obtained by copolymerizing ethylene with a cyclic olefin of the general formula:

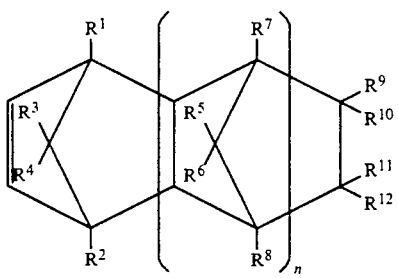

(I)

wherein n is 0 or a positive integer, $R^1$ through $R^{12}$ are independently selected from the group consisting of a hydrogen atom, halogen atom, and hydrocarbon group, and $R^9$ through $R^{12}$, taken together, may form a mono- or polycyclic group which may have a double bond, or $R^9$ and $R^{10}$ or $R^{11}$ and $R^{12}$, taken together, may form an alkylidene group.

The cyclic olefins of formula (I) may be synthesized by condensing cyclopentadienes and corresponding olefins by Diels-Alder reaction.

Illustrative, non-limiting examples of the cyclic olefin of formula (I) include octahydronaphthalenes such as tetracyclo[4,4,0,1$^{2,5}$,1$^{7,10}$]-3-dodecene(1,4,5,8-dimethano -1,2,3,4,4a,5,8,8a-octahydronaphthalene), 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-hexyl-1,4,5,8-dimethano-1,2,3,4,4a,5,8,8a-ocatahydronaphthalene, 2-hexyl-1,4,5,8-dimethano-1,2,3,4,4a,5,8,8a-ocatahydronaphthalene, 2,3-dimethyl-1,4,5,8-dimethano-1,2,3,4,4a,5,8,8a-ocatahydronaphthalene, 2-methyl-3-ethyl-1,4,5,8-dimethano-1,2,3,4,4a,5,8,8a-ocatahydronaphthalene, 2-chloro-1,4,5,8-dimethano-1,2,3,4,4a,5,8,8a-ocatahydronaphthalene, 2-bromo-1,4,5,8-dimethano-1,2,3,4,4a,5,8,8a-ocatahydronaphthalene, 2-fluoro-1,4,5,8-dimethano-1,2,3,4,4a,5,8,8a-ocatahydronaphthalene, 2,3-dichloro-1,4,5,8-dimethano-1,2,3,4,4a,5,8,8a-ocatahydronaphthalene, 2-cyclohexyl-1,4,5,8-dimethano-1,2,3,4,4a,5,8,8a-ocatahydronaphthalene, 2-n-butyl-1,4,5,8-dimethano-1,2,3,4,4a,5,8,8a-ocatahydronaphthalene, 2-isobutyl-1,4,5,8-dimethano-1,2,3,4,4a,5,8,8a-ocatahydronaphthalene, etc.

Other examples of the cyclic olefin of formula (I) include
bicyclo[2,2,1]hept-2-ene derivatives such as bicyclo[2,2,1]hept-2-ene,
6-methylbicyclo[2,2,1]hept-2-ene,
5,6-dimethylbicyclo[2,2,1]hept-2-ene,
1-methylbicyclo[2,2,1]hept-2-ene,
6-ethylbicyclo[2,2,1]hept-2-ene,
6-n-butylbicyclo[2,2,1]hept-2-ene,
6-isobutylbicyclo[2,2,1]hept-2-ene,
7-methylbicyclo[2,2,1]hept-2-ene, etc.;
tetracyclo[4,4,0,1$^{2,5}$,1$^{7,10}$]-3-dodecene derivatives such as
tetracyclo[4,4,0,1$^{2,5}$,1$^{7,10}$]-3-dodecene,
5,10-dimethyltetracyclo[4,4,0,1$^{2,5}$,1$^{7,10}$]-3-dodecene,
2,10-dimethyltetracyclo[4,4,0,1$^{2,5}$,1$^{7,10}$]-3-dodecene,
11,12-dimethyltetracyclo[4,4,0,1$^{2,5}$,1$^{7,10}$]-3-dodecene,
2,7,9-trimethyltetracyclo[4,4,0,1$^{2,5}$,1$^{7,10}$]-3-dodecene,
9-ethyl-2,7-dimethyltetracyclo[4,4,0,1$^{2,5}$,1$^{7,10}$]-3-dodecene,
9-isobutyl-2,7-dimethyltetracyclo[4,4,0,1$^{2,5}$,1$^{7,10}$]-3-dodecene,
9,11,12-trimethyltetracyclo[4,4,0,1$^{2,5}$,1$^{7,10}$]-3-dodecene,
9-ethyl-11,12-dimethyltetracyclo[4,4,0,1$^{2,5}$,1$^{7,10}$]-3-dodecene,
9-isobutyl-11,12-dimethyltetracyclo[4,4,0,1$^{2,5}$,1$^{7,10}$]-3-dodecene,
5,8,9,10-tetramethyltetracyclo[4,4,0,1$^{2,5}$,1$^{7,10}$]-3-dodecene,
8-methyltetracyclo[4,4,0,1$^{2,5}$,1$^{7,10}$]-3-dodecene,
8-ethyltetracyclo[4,4,0,1$^{2,5}$,1$^{7,10}$]-3-dodecene,
8-propyltetracyclo[4,4,0,1$^{2,5}$,1$^{7,10}$]-3-dodecene,
8-hexyltetracyclo[4,4,0,1$^{2,5}$,1$^{7,10}$]-3-dodecene,
8-stearyltetracyclo[4,4,0,1$^{2,5}$,1$^{7,10}$]-3-dodecene,
8,9-dimethyltetracyclo[4,4,0,1$^{2,5}$,1$^{7,10}$]-3-dodecene,
8-methyl-9-ethyltetracyclo[4,4,0,1$^{2,5}$,1$^{7,10}$]-3-dodecene,
8-chlorotetracyclo[4,4,0,1$^{2,5}$,1$^{7,10}$]-3-dodecene,
8-bromotetracyclo[4,4,0,1$^{2,5}$,1$^{7,10}$]-3-dodecene,
8-fluorotetracyclo[4,4,0,1$^{2,5}$,1$^{7,10}$]-3-dodecene,
8,9-dichlorotetracyclo[4,4,0,1$^{2,5}$,1$^{7,10}$]-3-dodecene,
8-cyclohexyltetracyclo[4,4,0,1$^{2,5}$,1$^{7,10}$]-3-dodecene,
8-isobutyltetracyclo[4,4,0,1$^{2,5}$,1$^{7,10}$]-3-dodecene,
8-butyltetracyclo[4,4,0,1$^{2,5}$,1$^{7,10}$]-3-dodecene,
8-ethylidenetetracyclo[4,4,0,1$^{2,5}$,1$^{7,10}$]-3-dodecene,
8-ethylidene-9-methyltetracyclo[4,4,0,1$^{2,5}$,1$^{7,10}$]-3-dodecene,
8-ethylidene-9-ethyltetracyclo[4,4,0,1$^{2,5}$,1$^{7,10}$]-3-dodecene,
8-ethylidene-9-isopropyltetracyclo[4,4,0,1$^{2,5}$,1$^{7,10}$]-3-dodecene,
8-ethylidene-9-butyltetracyclo[4,4,0,1$^{2,5}$,1$^{7,10}$]-3-dodecene,
8-n-propylidenetetracyclo[4,4,0,1$^{2,5}$,1$^{7,10}$]-3-dodecene, 8-n-propylidene-9-methyltetracyclo[4,4,0,1$^{2,5}$,1$^{7,10}$]-3-dodecene,
8-n-propylidene-9-ethyltetracyclo[4,4,0,1$^{2,5}$,1$^{7,10}$]-3-dodecene,
8-n-propylidene-9-isopropyltetracyclo[4,4,0,1$^{2,5}$,1$^{7,10}$]-3-dodecene,
8-n-propylidene-9-butyltetracyclo[4,4,0,1$^{2,5}$,1$^{7,10}$]-3-dodecene,
8-isopropylidenetetracyclo[4,4,0,1$^{2,5}$,1$^{7,10}$]-3-dodecene,
8-isopropylidene-9-methyltetracyclo[4,4,0,1$^{2,5}$,1$^{7,10}$]-3-dodecene,
8-isopropylidene-9-ethyltetracyclo[4,4,0,1$^{2,5}$,1$^{7,10}$]-3-dodecene,
8-isopropylidene-9-isopropyltetracyclo[4,4,0,1$^{2,5}$,1$^{7,10}$]-3-dodecene,
8-isopropylidene-9-butyltetracyclo[4,4,0,1$^{2,5}$,1$^{7,10}$]-3-dodecene, etc.;
hexacyclo[6,6,1,1$^{3,6}$,1$^{10,13}$,0$^{2,7}$,0$^{9,14}$]-4-heptadecene derivatives such as
hexacyclo[6,6,1,1$^{3,6}$,1$^{10,13}$,0$^{2,7}$,0$^{9,14}$]-4-heptadecene,
12-methylhexacyclo[6,6,1,1$^{3,6}$,1$^{10,13}$,0$^{2,7}$,0$^{9,14}$]-4-heptadecene,
12-ethylhexacyclo[6,6,1,1$^{3,6}$,1$^{10,13}$,0$^{2,7}$,0$^{9,14}$]-4-heptadecene,
12-isobutylhexacyclo[6,6,1,1$^{3,6}$,1$^{10,13}$,0$^{2,7}$,0$^{9,14}$]-4-heptadecene,
1,6,10-trimethyl-12-isobutylhexacyclo-[6,6,1,1$^{3,6}$,1$^{10,13}$,0$^{2,7}$,0$^{2,7}$,0$^{9,14}$]-4-heptadecene, etc.;
octacyclo[8,8,0,1$^{2,9}$,1$^{4,7}$,1$^{11,18}$,1$^{13,16}$,0$^{3,8}$,0$^{12,17}$]-5-docoocene derivatives such as
octacyclo[8,8,0,1$^{2,9}$,1$^{4,7}$,1$^{11,18}$,1$^{13,16}$,0$^{3,8}$,0$^{12,17}$]-5-docoocene,
15-methyloctacyclo[8,8,0,1$^{2,9}$,1$^{4,7}$,1$^{11,18}$,1$^{13,16}$,0$^{3,8}$,0$^{12,17}$]-5-docoocene,
15-ethyloctacyclo[8,8,0,1$^{2,9}$,1$^{4,7}$,1$^{11,18}$,1$^{13,16}$,0$^{3,8}$,0$^{12,17}$]-5-docoocene, etc.;
pentacyclo[6,6,1,1$^{3,6}$,0$^{2,7}$,0$^{9,14}$]-4-hexadecene derivatives such as
pentacyclo[6,6,1,1$^{3,6}$,0$^{2,7}$,0$^{9,14}$]-4-hexadecene,
1,3-dimethylpentacyclo[6,6,1,1$^{3,6}$,0$^{2,7}$,0$^{9,14}$]-4-hexadecene,
1,6-dimethylpentacyclo[6,6,1,1$^{3,6}$,0$^{2,7}$,0$^{9,14}$]-4-hexadecene,
15,16-dimethylpentacyclo[6,6,1,1$^{3,6}$,0$^{2,7}$,0$^{9,14}$]-4-hexadecene, etc.;
heptacyclo-5-icosene derivatives and heptacyclo-5-heneicosene derivatives such as
heptacyclo[8,7,0,1$^{2,9}$,1$^{4,7}$,1$^{11,17}$,0$^{3,8}$,0$^{12,16}$]-5-icosene,
heptacyclo[8,7,0,1$^{2,9}$,1$^{4,7}$,1$^{11,17}$,0$^{3,8}$,0$^{12,16}$]-5-heneicosene, etc.;
tricyclo[4,3,0,1$^{2,5}$]-3-decene derivatives such as
tricyclo[4,3,0,1$^{2,5}$]-3-decene,
2-methyltricyclo[4,3,0,1$^{2,5}$]-3-decene,
5-methyltricyclo[4,3,0,1$^{2,5}$]-3-decene, etc.;
tricyclo[4,4,0,1$^{2,5}$]-3-undecene derivatives such as
tricyclo[4,4,0,1$^{2,5}$]-3-undecene,
10-methyltricyclo[4,4,0,1$^{2,5}$]-3-undecene, etc.;
pentacyclo[6,5,1,1$^{3,6}$,0$^{2,7}$,0$^{9,13}$]-4-pentadecene derivatives such as
pentacyclo[6,5,1,1$^{3,6}$,0$^{2,7}$,0$^{9,13}$]-4-pentadecene,
1,3-dimethylpentacyclo[6,5,1,1$^{3,6}$,0$^{2,7}$,0$^{9,13}$]-4-pentadecene,
1,6-dimethylpentacyclo[6,5,1,1$^{3,6}$,0$^{2,7}$,0$^{9,13}$]-4-pentadecene,
14,15-dimethylpentaoyclo[6,5,1,1$^{3,6}$,0$^{2,7}$,0$^{9,13}$]-4-pentadecene, etc.;
pentacyclo[6,5,1,1$^{3,6}$,0$^{2,7}$,0$^{9,13}$]-4,10-pentadecadiene derivatives;
pentacyclo[4,7,0,1$^{2,5}$,0$^{8,13}$,0$^{9,12}$]-3-pentadecene derivatives such as
pentacyclo[4,7,0,1$^{2,5}$,0$^{8,13}$,0$^{9,12}$]-3-pentadecene,
methyl-substituted pentacyclo[4,7,0,1$^{2,5}$,0$^{8,13}$,0$^{9,12}$]-3-pentadecene, etc.;
heptacyclo[7,8,0,1$^{3,6}$,0$^{2,7}$,1$^{10,17}$,0$^{11,16}$,1$^{12,15}$]-4-eicosene derivatives such as
heptacyclo[7,8,0,1$^{3,6}$,0$^{2,7}$,1$^{10,17}$,0$^{11,16}$,1$^{12,15}$]-4-eicosene, dimethyl-substituted heptacyclo-[7,8,0,1$^{3,6}$,0$^{2,7}$,1$^{10,17}$,0$^{11,16}$,1$^{12,15}$]-4-eicosene, etc.;
nonacyclo[9,10,1,1$^{4,7}$,0$^{3,8}$,0$^{2,10}$,0$^{12,21}$,1$^{13,20}$,0$^{14,19}$,1$^{15,18}$]-5-pentacosene derivatives such as
nonacyclo[9,10,1,1$^{4,7}$,0$^{3,8}$,0$^{2,10}$,0$^{12,21}$,1$^{13,20}$,0$^{14,19}$,1$^{15,18}$]-5-pentacosene,
trimethyl-substituted nonacyclo-[9,10,1,1$^{4,7}$,0$^{3,8}$,0$^{2,10}$,0$^{12,21}$,1$^{13,20}$,0$^{14,19}$,1$^{15,18}$]-5-pentacosene, etc.

The cyclic olefin polymers are essentially composed of ethylene and a cyclic olefin of formula (I) and optionally, another copolymerizable unsaturated monomeric component. Such optional mcnomers include α-olefins having 3 to 20 carbon atoms, for example, propylene, 1-butene, 4-methyl-1-pentene, 1-hexene, 1-decene, 1-dodecene, 1-tetradecene, 1-hexadecene, 1-ocatadecene, and 1-eicosene.

The cyclic olefin polymers may be used alone, but often mixed to form a blend having a desired thermal softening point T2 as will be described later. Copolymers of at least one cyclic olefin may be prepared under suitably selected conditions by such methods as disclosed in JP-A 168708/1985, 120816/1986, 115912/1986, 115916/1986, 271308/1986, and 272216/1986 and Japanese Patent Application Nos. 95905/1986 and 90906/1986.

Included are random copolymers of cyclic olefins, homopolymers and copolymers containing recurring units obtained through ring-opening polymerization of cyclic olefins of formula (I), and homopolymers and copolymers containing such, but hydrogenated recurring units.

Anti-oxidants, stabilizers and other additives may be incorporated in the cyclic olefin polymers.

The substrates obtained by injection molding the cyclic polyolefin composition should have a diameter of at least 200 mm. Substrates with a diameter of less than 200 mm provide no substantial difference from polycarbonate substrates injection molded under optimum conditions, and do not manifest the benefits of output increase and noise reduction according to the invention. By contrast, substrates having a larger diameter of at least 200 mm manifest a C/N improvement by 2 to 5 dB or more and a noise reduction. No particular upper limit is imposed on the substrate diameter although it is generally up to about 380 mm.

The substrates are about 1.0 to 1.5 mm thick. The substrates on the surface may be provided with a pattern in the form of grooves and pits carrying pre-format information. The substrates may be integrally formed with hubs in which glass fibers may be incorporated for preventing crazing and cracking.

The polyolefin substrates are substantially transparent to recording and reproducing light, typically semiconductor laser light having a wavelength of about 600 to 900 nm, often about 700 to 800 nm, most often 780 nm. A light transmittance of at least 80% is preferred. This permits recording and reproduction from the rear surface of the substrate.

Under its surface bearing the recording layer, the preferred substrate includes a skin layer having a thermal softening point of up to about 140° C., especially about 100° to 140° C., more preferably about 100° to 135° C., most preferably about 110° to 135° C. A skin layer having a thermal softening point of higher than 140° C. would adversely affect recording sensitivity and C/N whereas a skin layer having a thermal softening point of lower than 100° C. would be low in dimensional accuracy and less resistant against heat encountered during deposition of a reflective layer.

For the skin layer forming a surface layer of the cyclic polyolefin substrate, the thermal softening point is defined as follows. Measurement is made by placing a cylindrical needle having a diameter of about 1 mm in cross section on a substrate to be tested and applying a load of about 5 grams. While heating the substrate from a temperature of about 30° C. at a rate of about 2° C./min., the penetration of the loaded needle is measured.

FIG. 1 shows the penetration plotted in relation to temperature. In the penetration vs temperature profile of the cyclic polyolefin substrate, there develop two, first and second, bend points in contrast to the fact that substrates which are cast or injection molded from other resins develop only one bend point (corresponding to the second bend point in FIG. 1) or a faint first bend point, if any, in the penetration vs temperature profile. Such a penetration vs temperature profile is measurable by means of a commercially available thermo-mechanical analyzer (TMA), for example, TMA Model 943 manufactured by E. I. duPont.

The first stage penetration corresponding to the first bend point in FIG. 1 is up to about 200 μm in most samples. It is thus believed that the first bend point is attributable to the softening point of the skin layer or substrate surface layer. In proximity to the first bend point of the penetration vs temperature profile, the thermal softening point of the skin layer is defined as the intersection, designated T1, between a rectilinear trail of the straight section before the onset of needle penetration and a rectilinear extension of the first stage penetration. As previously defined, primary softening point T1 is limited up to about 140° C., especially from about 100° to 140° C.

In proximity to the second bend point of the penetration vs temperature profile, the secondary thermal softening point of the substrate is defined as the intersection, designated T2, between a rectilinear extension of the transition from the first to second stage penetration and a rectilinear extension of the second stage penetration. It is believed that the secondary thermal softening point T2 is the thermal softening point of the substrate at the center. Preferably, the secondary thermal softening point T2 is higher than the secondary thermal softening point T1 by at least 10° C., more preferably by 10° to 50° C. Typically, T2 is at least 140° C., especially from about 145° to 180° C. because improvements in dimensional accuracy, mechanical properties, and heat resistance are expectable.

It is to be noted that the skin layer is observable as a layer of different color from the underlying area in a SEM image of a cross section of the substrate transverse to its surface. The thickness of the skin layer generally ranges from about 1 to 200 μm, especially from about 10 to 100 μm.

Such a skin layer can be established by various means, preferably by injection molding the cyclic polyolefin composition. When the composition is cast, for example, it has only the secondary thermal softening point T2. To establish a skin layer by injection molding the cyclic polyolefin composition, molding parameters should be properly selected. Preferred molding parameters include an injection pressure of about 250 to 400 kg/cm$^2$, a melt temperature of about 300° to 400° C., and a mold temperature of about 80° to 120° C. while the remaining parameters like dwell pressure and mold clamping force may be as usual.

If desired, the substrate may be formed with an oxygen impermeable coating on its outer surface and outer periphery surface.

DISK STRUCTURE

A recording layer is formed on the substrate directly or through a suitable undercoat layer or intermediate layer. Various optical recording disk structures are completed by forming a protective layer, reflective layer or the like on the recording layer, as the case may be.

The optical recording disks include magneto-optical recording disks in which information is magnetically recorded by a modulated thermal beam or modulated magnetic field and reproduced through magneto-optical conversion; erasable disks such as optical recording disks having a phase change type recording layer wherein information is recorded and reproduced by way of a change in reflectivity; and write-once disks such as optical recording disks of the air sandwich structure having a pit-formation type recording layer in which pit formation results in a change of reflectivity and optical recording disks additionally having a reflective layer corresponding to the laser disk (LD) standard.

The optical recording disks of large diameter are rotated at a number of revolutions of at least 1,800 rpm while recording/reproducing operation is carried out. With a number of revolutions of lower than 1,800 rpm, the benefits of output increase and noise reduction according to the invention are not manifested. The upper limit of the number of revolutions is generally about 5,400 rpm and the rotating system may be either CAV or CLV.

Figure 2:
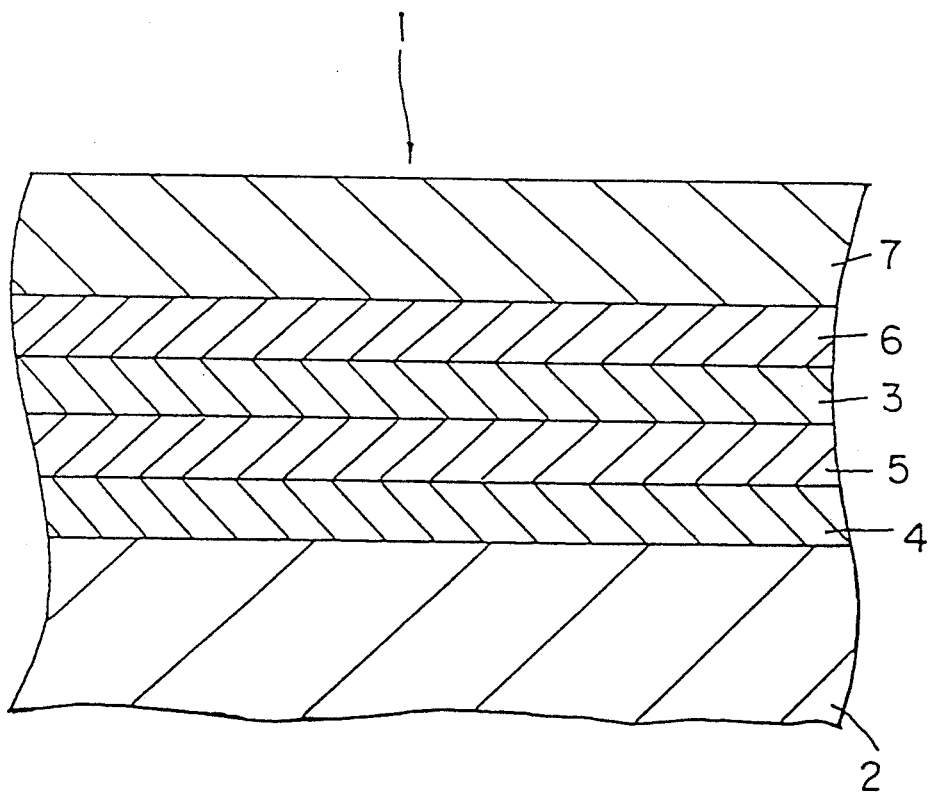
FIG. 2 is a fragmental cross-sectional view of a magneto-optical recording disk according to one preferred embodiment in the first form of the invention.

Referring to FIG. 2, there is illustrated a magneto-optical recording medium according to one preferred embodiment of the present invention. The medium generally designated at 1 includes a recording layer 3 on a substrate 2. The recording layer 3 is formed on the substrate 2 through an undercoat layer which includes a protective layer 4 and an intermediate layer 5 in the illustrated embodiment.

The intermediate layer 5 is provided for improving C/N ratio and may be formed of any dielectric material to a thickness of about 30 to 150 nm.

In addition to the protective layer 4, another protective layer 6 may be formed over the recording layer 3. When both the protective layers 4 and 6 are formed, they may be of an identical or different composition. Since these protective layers 4 and 6 serve to improve corrosion resistance, at least one of them should preferably be provided, most preferably both. The protective layers 4 and 6 are preferably inorganic thin films of an oxide, carbide, nitride, sulfide or a mixture thereof.

Alternatively, they may be formed of the same type of material as the intermediate layer. They have a thickness of about 30 to 300 nm for corrosion resistance enhancement.

The protective layers 4 and 6 and intermediate layer 5 may be formed by any gas phase deposition method, for example, sputtering, evaporation, and ion plating, with sputtering being preferred.

In this embodiment, the recording layer 3 is a layer in which information is magnetically recorded by means of a modulated thermal beam or a modulated magnetic field and the recorded information is reproduced through magneto-optical conversion.

The material of the recording layer 3 is not critical insofar as magneto-optical recording is possible. Preferably, an alloy containing a rare earth metal, more preferably a rare earth metal and a transition metal is sputtered, evaporated or ion platted to form an amorphous film, with sputtering recommended. The rare earth metals used herein include Tb, Dy, Nd, Gd, Sm, and Ce, and mixtures thereof. The transition metals include Fe and Co. Preferably the alloy consists essentially of Fe and Co in a total content of 65 to 85 atom % and the balance of a rare earth metal or metals. The preferred recording layer has a composition: TbFeCo, DyTbFeCo, NdDyFeCo, NdGdFeCo, and the like. The recording layer may contain up to 10 atom % of an additional metal or metals selected from Cr, Al, Ti, Pt, Si, Mo, Mn, V, Ni, Cu, Zn, Ge, and Au. Also, the recording layer may contain up to 10 atom % of another rare earth metal or metals selected from Sc, Y, La, Ce, Pr, Pm, Sm, Eu, Ho, Er, Tm, Yb, and Lu.

The recording layer 3 generally has a thickness of about 10 to about 1,000 nm.

Even when the recording layer 3 and intermediate layer 5 as the undercoat layer are formed by a gas phase deposition method, typically sputtering, the skin layer developed in the substrate is effective in preventing the overlying layers 3, 5 from separating from the substrate 2.

A protective coat 7 is preferably provided on the second protective layer 6 for the purpose of improving corrosion resistance and mar resistance. It may be formed from various resinous materials, typically UV-curable resins to a thickness of about 0.1 to 100 μm. Although the protective coat 7 may be a deposited layer or a preformed sheet, it is preferably formed by coating a composition of a radiation-curable compound and a photopolymerization sensitizer and curing the coating with radiation.

Also, the present invention is applicable to optical recording disks having a recording layer of the phase change type which utilizes a change of reflectivity for recording and reproducing operation. The recording layer of this type includes Te-Se base alloys as disclosed in Japanese Patent Publication (JP-B) No. 41902/1979 and Japanese Patent No. 1004835, Te-Ge base alloys as disclosed in Japanese Patent Application Kokai (JP-A) No. 76035/1987, Te-In base alloys as disclosed in JP-A No. 56827/1988, Te-Sn base alloys as disclosed in Japanese Patent Application Nos. 307298/1986 and 307299/1986, Te oxides as disclosed in JP-A 54338/1983 and Japanese Patent Nos. 974257 and 974258, and other Te and Se base chalcogenides; alloys capable of amorphous-crystalline transition such as Ge-Sn and Si-Sn; and alloys capable of producing a color change through a crystal structure change such as Ag-Zn, Ag-Al-Cu, and Cu-Al and alloys capable of producing a grain size change such as In-Sb.

Any of these recording layers may have an undercoat layer or protective layer formed by a gas phase deposition method.

The embodiments of the present invention wherein the recording layer and the undercoat layer, if any, are formed by a gas phase deposition method, typically sputtering are adapted for phase change type optical recording disks having a metal recording layer and magneto-optical recording disks having a recording layer containing a rare earth metal element.

Figure 3:
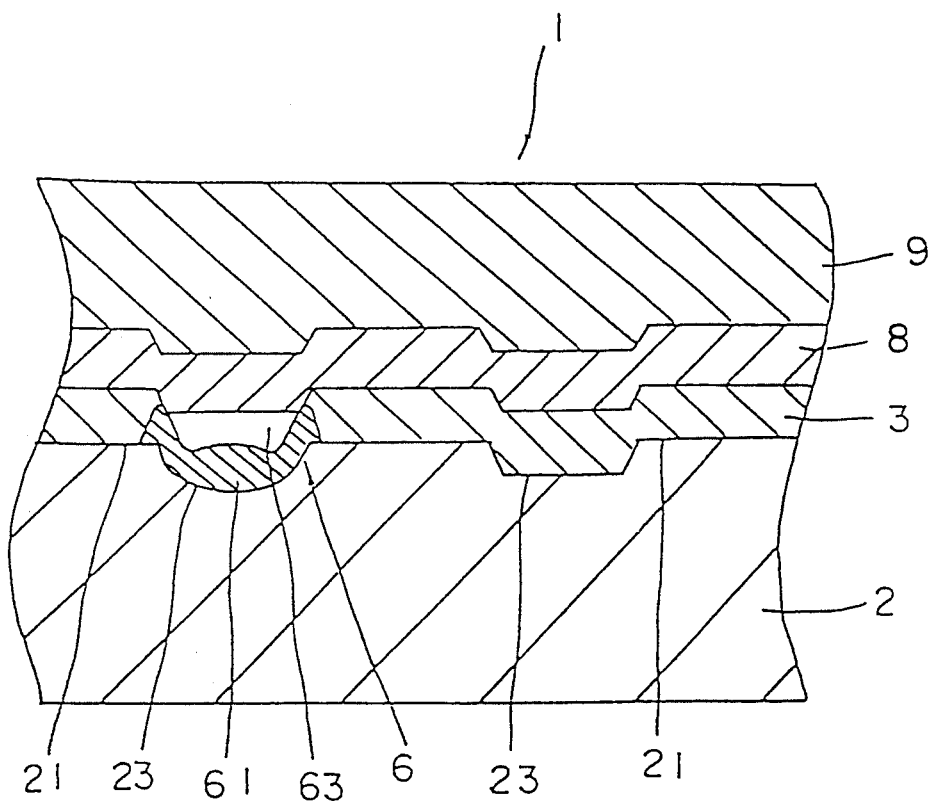
FIG. 3 is a fragmental cross-sectional view of an optical recording disk having a dye-containing recording layer according to another preferred embodiment in the first form of the invention.

Referring to FIG. 3, there is illustrated in cross section a portion of an optical recording medium generally designated at 1 according to another preferred embodiment of the invention. The medium 1 is an optical recording disk of the close contact type including a substrate 2, a dye-containing recording layer 3 on the substrate, and a reflective layer 8 and a protective layer 9 on the recording layer 3 in close arrangement. The substrate 2 on the surface is provided with tracking grooves 23 and lands therebetween.

The recording layer 3 contains a light absorbing dye or a compatible mixture of two or more dyes. The light absorbing dye may be mixed with a quencher. An ionically bound combination of a dye cation and a quencher anion may also be used as the light absorbing dye.

The recording layer 3 should preferably have a coefficient of extinction (the imaginary part of a complex index of refraction) k of from 0.03 to 0.25 at the wavelength of recording and reproducing light. With k of less than 0.03, the recording layer can have a lower absorptivity so that it might become difficult to record with a commonly used power, whereas k of more than 0.05 can result in a drop of reflectivity to below 70%, often failing to reproduce according to the CD standard.

The recording layer should preferably have an index of refraction (the real part of a complex index of refraction) n of from 1.8 to 4.0, more preferably 2.2 to 3.3 at the wavelength of recording and reproducing light. With n<1.8, reduced reflectivity would make it difficult to reproduce according to the CD standard. Few dyes are available which can achieve n>4.0.

In determining n and k, a sample is prepared by forming a recording layer on a given transparent substrate to a thickness of about 400 to 1,000 Å. Then the reflectivity of the sample is measured through the substrate or from the recording layer side. Reflectivity is measured in a mirror reflection mode (of the order of 5°) using light having the recording/reproducing wavelength. The transmittance of the sample is also measured. The index of refraction n and coefficient of extinction k may be calculated from these measurements according to K. Ishiguro, "Optics," Kyoritsu Publishing K.K., pages 168-178.

The light absorbing dyes used herein are not critical insofar as they have maximum absorption at a wavelength in the range of 600 to 900 nm, preferably 600 to 800 nm, more preferably 650 to 750 nm. Included are cyanine, phthalocyanine, naphthalocyanine, anthraquinone, azo, triphenylmethane, pyrylium or thiapyrylium salt, squarylium, and croconium dyes, and metal complex dyes. Preferred dyes are cyanine dyes, especially cyanine dyes having an indolenine ring, typically benzoindolenine ring.

Often the recording layer 3 has a thickness of about 500 to about 2,000 Å to provide sufficient reflectivity.

The reflective layer 8 is applied to the recording layer 3 in direct contact therewith. Any desired high reflectivity material, for example, Au, Ag, Cu and the like and alloys thereof may be used to form the reflective layer.

The reflective layer 8 preferably has a thickness of at least about 500 Å. It can be formed by evaporation or sputtering. Although no upper limit is generally imposed on the thickness of the reflective layer, a thickness of up to about 1,200 Å is preferred for manufacturing cost and time. The reflective layer alone has a reflectivity of at least 90%, and the reflectivity of an unrecorded portion of the medium through the substrate can be at least 60%, especially at least 70%.

The protective layer 9 may be formed on the reflective layer 8. The protective layer may be formed from any desired resin material such as a UV-curable resin, usually to a thickness of about 0.1 to 100 $\mu$m. The protective layer may be either a layer or a sheet. The protective layer is preferably prepared by coating a composition of a radiation-curable compound and a photopolymerization sensitizer and curing the coating with radiation.

Preferably, the protective layer has a hardness in the range of H to 8H, especially 2H to 7H in pencil hardness at 25° C. according to JIS K-5400. This hardness range leads to an improved eye pattern and a substantial reduction of jitter. In addition, the protective layer will not separate from the underlying reflective layer during shelf storage under high-temperature, high-humidity conditions or varying temperature and humidity conditions. More specifically, the eye pattern can be disturbed and the jitter can increase if the protective layer is softer than pencil hardness H. A protective layer harder than 8H becomes brittle and difficult to form or does not fully adhere to the underlying reflective layer.

The radiation curable compounds used in forming the protective layer include oligoester acrylates. The oligoester acrylates are oligoester compounds having a plurality of acrylate or methacrylate groups. Preferred oligoester acrylates have a molecular weight of 1,000 to 10,000 more preferably 2,000 to 7,000 and a degree of polymerization of 2 to 10, more preferably 3 to 5. Most preferred are polyfunctional oligoester acrylates having 2 to 6, especially 3 to 6 acrylate or methacrylate groups. In addition to or instead of the oligoester acrylates, there may be used radiation-curable compounds in the form of thermoplastic resins modified to be radiation sensitive.

The protective layer of such a radiation-curable compound preferably has a thickness of from about 0.1 to 30 $\mu$m, more preferably from about 1 to 10 $\mu$m. A protective layer of thinner than 0.1 $\mu$m is often difficult to form uniformly and insufficient as a moisture barrier in a humid atmosphere so that the underlying recording layer might become less durable. Jitter prevention also becomes insufficient. A protective layer thicker than 30 $\mu$m tends to invite distortion of the overall recording medium and cracking of the protective layer itself due to shrinkage upon curing.

The protective layer may be formed by any desired well-known technique, for example, spinner coating, gravure coating, spraying, dipping, and combinations thereof. The conditions under which the protective layer is formed may be determined by taking into account the viscosity of a coating composition, the desired coating thickness, and other factors without undue experimentation.

The radiation to which the coating is exposed may be ultraviolet (UV) radiation, electron radiation, or the like, with UV being preferred. For UV curing, a photopolymerization sensitizer is generally added to the radiation-curable compounds. As the photopolymerization sensitizer, any well-known compounds may be used, for example, benzoins such as benzoin methyl ether, benzoin ethyl ether, $\alpha$-methylbenzoin, and $\alpha$-chlorodeoxybenzoin, ketones such as benzophenone, acetophenone, and bisdialkylaminobenzophenone, quinones such as anthraquinone and phenanthraquinone, and sulfides such as benzyl disulfide and tetramethylthiuram monosulfide.

A coating containing a radiation-curable compound and a photopolymerization sensitizer as defined above may be cured with radiation by any well-known methods. For example, UV lamps such as xenon discharge lamps and mercury discharge lamps are used. If desired, electron radiation may be used.

OPERATION

Recording or additional recording may be carried out on the optical recording medium 1 of the construction shown in FIG. 3 by directing recording light having a wavelength of 780 nm, for example, in pulse form to the recording layer 3 in a groove 23 through the substrate 2 to form a pit 6. The recording layer 3 absorbs light so that it is heated while the substrate 2 is heated at the same time. As a result, the recording material, typically dye melts or decomposes near the interface between the substrate 2 and the recording layer 3, applying a pressure to the interface to deform the bottom and side walls of the groove 23.

The melted or decomposed products of the recording material leave a mass 61 on the bottom of the groove 23. Since the decomposed mass 61 somewhat invades the substrate where the skin layer having a certain thermal softening point covers, the pit 6 becomes convex toward the substrate and larger in dimensions than the geometry of the recording layer originally confined in the groove 23. The depression of the substrate is generally up to about 300 Å deep although it depends on the size of the pit 6 formed.

The decomposed mass 61 consists essentially of the decomposed product of the recording material or a mixture of the decomposed product of the recording material and the recording material, but does not substantially contain the substrate material. The decomposed mass 61 generally occupies about 30 to 100% of the original thickness of the recording layer 3 in the groove 23. Often, a space 63 is left above the decomposed mass 61 and below the reflective layer 8. In this regard, the decomposed mass 61 and space 63 form the pit 6. The space generally occupies about 5 to 70% of the original thickness of the recording layer 3.

It was empirically found that pits of well defined outer contour and constricted U shape were formed. The presence of the skin layer contributed to enlargement and configuration of pits and thus to C/N and sensitivity improvements.

Reproduction is carried out in a conventional manner by reading the pits with reproducing light. During recording and reproducing operation, the disk is rotated at 1,800 rpm or higher.

Next, the second form of the present invention having a pair of resin and glass substrates is described.

Figure 4:
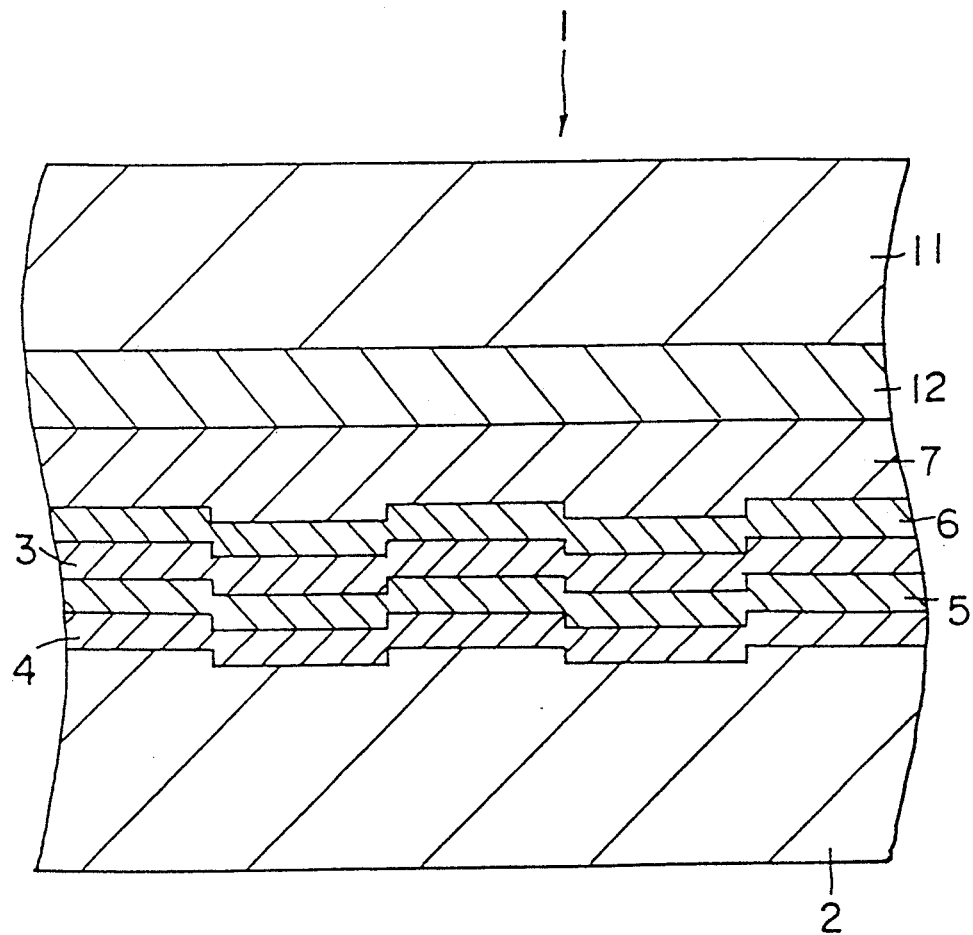
FIG. 4 is a fragmental cross-sectional view of a magneto-optical recording disk according to one preferred embodiment in the second form of the invention.

Referring to FIG. 4, a magneto-optical recording disk is illustrated in fragmentary cross-section as one preferred embodiment of the optical disk according to the second form of the invention.

The magneto-optical recording disk generally designated at 1 includes a substrate 2. The disk 1 has a protective layer 4 and an intermediate layer 5 as an undercoat, a recording layer 3, a protective layer 6, a protective coat 7, an adhesive layer 12, and a protective substrate 11 stacked one on top of another on the substrate 2 in the stated order.

The structural and compositional construction of the disk of FIG. 4 is the same as that of FIG. 2 except that the protective substrate 11 is adhesively attached and the substrate 2 is grooved on the surface. Therefore, substrate 2 is as defined for the first form, and the remaining layers including protective layer 4, intermediate layer 5, protective layer 6, and protective coat 7 are the same as previously described for the first form.

The protective substrate 11 is attached for the purpose of protecting the recording layer 3 from physical damage. The protective substrate 11 which is mated with the resin substrate 2 is of glass. By using one substrate formed of glass and another substrate formed of a cyclic polyolefin resin, there is obtained a lightweight, rigid, reliable optical disk. The disk can accommodate high speed rotation at 1,800 rpm or higher, especially at 3,000 rpm or higher without dynamic axial runout or deflection.

Since one of the substrates is formed of resin, a failure of the optical disk upon accidental falling or scattering of glass fragments when failed can be prevented. The preferred embodiment of optical disk wherein a recording layer is formed on the substrate 2 of cyclic polyolefin which is integrated with the protective substrate 11 of glass avoids birefringence which can interfere with recording/reproducing operation, provides improved weatherability and durability, and is successful in minimizing axial runout during high rotational speed driving. Since the cyclic polyolefin substrate side on which recording/reproducing operation is conducted is resistant to heat and humidity, the disk as a whole is substantially free of distortion or degradation during long term storage under high or low-temperature and high or low humidity conditions. Additionally, the cyclic polyolefin absorbs little water, which feature ensures that the recording layer is protected against moisture on the both sides and that axial runout is suppressed since the substrate itself is free of deflection due to water absorption.

The glass of which the protective substrate 11 is made is not critical and even the use of opaque glass is acceptable. Recording/reproducing operation is normally conducted from the substrate 2 side although recording from the protective substrate 11 side is possible if it is of transparent glass.

Preferably the protective substrate 11 is formed of tempered glass because higher rigidity, weatherability and durability are obtained. The tempered glasses are generally classified into physically tempered glasses and chemically tempered glasses in terms of their strengthening method, and a choice may be made for a particular use. The tempered glass used herein is not particularly limited, that is, any of conventional tempered glasses may be used.

Among the tempered glasses, preferred are glasses surface tempered by chemical strengthening. In general, glass is chemically tempered by replacing alkali metal ions in proximity of the glass surface by alkali metal ions of another species from the exterior whereby compression stresses are induced at the glass surface by the difference in the spatial volume occupied by the ions, thereby increasing mechanical strength. Chemical tempering is generally carried out by heating an alkali metal salt such as a nitrate and sulfate salt and dipping the glass in the molten salt for several hours to several ten hours. More illustratively, soda glass may be strengthened by using $KNO_3$ as the molten alkali salt to thereby substitute K ions for Na ions in the glass. Lithium-containing glass may be strengthened by dipping it in $NaNO_3$ to substitute Na ions for Li ions in the glass. Such surface tempered glasses are described in U.S. Pat. No. 3,287,200 and JP-A 43819/1987 and 175219/1988. Since the strengthened or compression stressed layer is present only in proximity to the glass surface, there results a surface tempered glass. The strengthened or compression stressed layer is preferably 10 to 200 $\mu$m, more preferably 30 to 75 $\mu$m thick.

The chemically tempered glass may be a soda-lime silicate glass as chemically tempered by the above method. An aluminosilicate glass as chemically tempered is more preferred because of its increased mechanical strength. The aluminosilicate glass preferably has an $Al_2O_3$ content of at least 10% by weight, especially 15 to 30% by weight. The preferred aluminosilicate glass used herein has the following composition:

| $SiO_2$ | 50 to 60% by weight |
| --- | --- |
| $Al_2O_3$ | 15 to 30% by weight |
| $B_2O_3$ | 1 to 10% by weight |
| $R(I)_2O$ | 10 to 25% by weight |
| $R(II)O$ | 1 to 10% by weight |
| $TiO_2$, etc. | 0 to 5% by weight | wherein R(I) and R(II) are monovalent and divalent metals, respectively, with the $K^+$ substitution being in the range of 0.01 to 1 $mg/cm^3$.

The protective substrate 11 has a sufficient thickness of about 0.5 to 2.0 mm to provide rigidity and a shape in geometrical conformity to the substrate 2.

The protective substrate 11 is integrated with the substrate 2 through the adhesive layer 12 such that the recording layer 3 is inside. A joint is achieved with any desired one of well-known adhesives.

Figure 5:
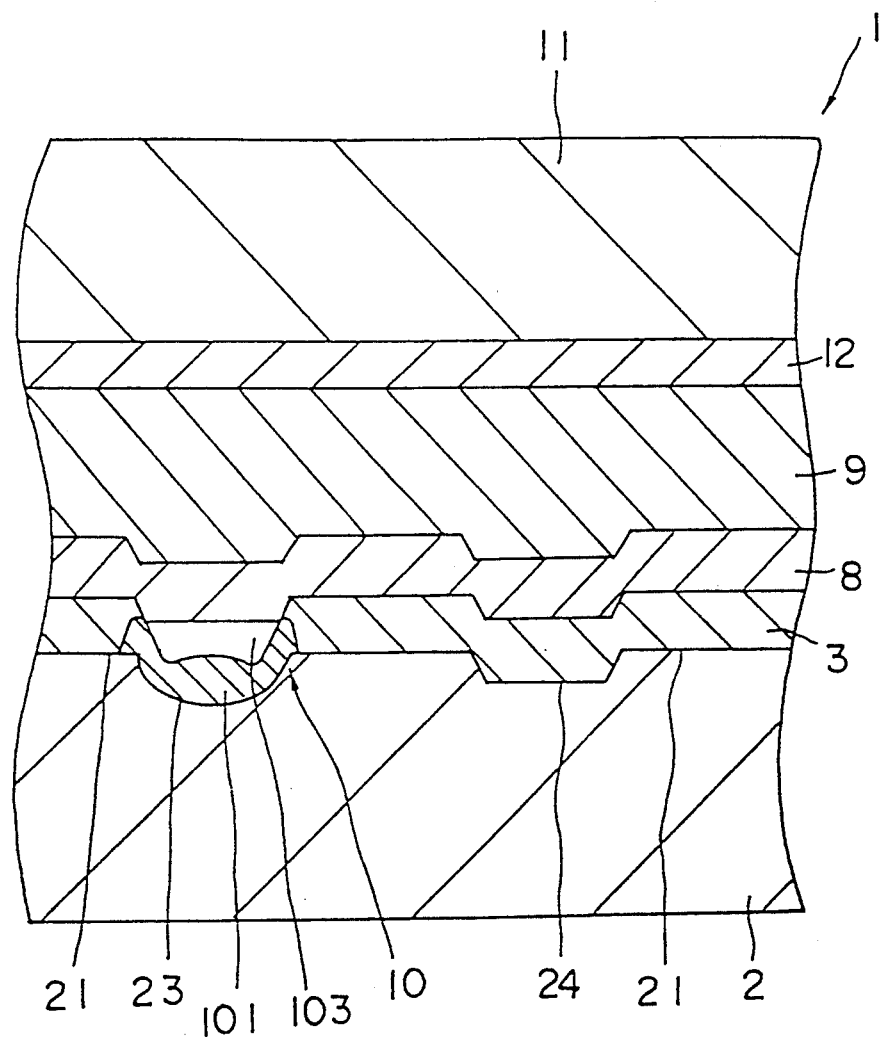
FIG. 5 is a fragmental cross-sectional view of an optical recording disk having a dye-containing recording layer according to another preferred embodiment in the second form of the invention.

FIG. 5 illustrates another preferred embodiment of the optical recording disk according to the second form of the invention. The disk 1 is an optical recording disk of the close contact type including a substrate 2, a dye-containing recording layer 3 on the substrate, and a reflective layer 8 and a protective layer 9 on the recording layer 3 in close arrangement. In this regard, the disk of FIG. 5 is the same as that of FIG. 3.

A protective substrate 11 of glass is integrated with the cyclic polyolefin base substrate 2 by attaching it to the protective layer 9 through an adhesive layer 12. The protective substrate 11 and adhesive layer 12 are the same as described above.

It will be appreciated that the disks of FIGS. 4 and 5 operate in the same manner as the disks of FIGS. 2 and 3.

EXAMPLE

Examples of the present invention are given below by way of illustration and not by way of limitation.

EXAMPLE 1

Two copolymers having different ethylene molar fractions were obtained by random polymerizing ethylene and tetracyclo[4,4,0,$1^{2,5}$,$1^{7,10}$]-3-dodecene (abbreviated as DMON) in accordance with the disclosure of JP-A 168708/1985. They were blended to form a blend having a softening point (T2) of 163° C. as measured by TMA. The blend was melted at 350° C. and injection molded at a mold temperature of 100° C. and an injection pressure of 350 kg/cm$^2$ to form a substrate having a diameter of 300 mm and a thickness of 1.2 mm. The substrate had a spiral tracking groove on the surface.

On the substrate were formed a protective layer of glass, an intermediate layer of SiNx, a recording layer of TbFeCo, protective layer of SiNx, and a protective coat of resin in this order. A magneto-optical recording disk of the double side recording type was fabricated by adhesively joining a pair of such substrates each having a recording layer such that the recording layers faced each other.

While the disk was rotated at 3,600 rpm, signals were recorded at a frequency of 10 MHz and then reproduced to measure a C/N ratio and noise level at a position corresponding to a diameter of 175 mm (linear velocity 33 m/s) and a position corresponding to a diameter of 130 mm (linear velocity 24 m/s). The results are shown in Table 1.

TABLE 1

| 300 mm diameter disk, 3600 rpm | | |
|---|---|---|
| | Cyclic polyolefin | Polycarbonate |
| C/N (dB) | | |
| 130 mm diameter | 53.8 | 50.2 |
| 175 mm diameter | 57.5 | 54.0 |
| Noise level (dB) | | |
| 130 mm diameter | −73.8 | −73.0 |
| 175 mm diameter | −75.5 | −74.0 |

For comparison purpose, Table 1 also reports the results of a similar disk using substrates formed by injection molding bisphenol-A type polycarbonate (number average molecular weight 15,000) under optimum conditions, i.e., a melt temperature of 340° C., a mold temperature of 100° C., and an injection pressure of 300 kg/cm$^2$.

Another comparison was made between substrates of the same cyclic polyolefin and polycarbonate as above, provided that the substrates had a diameter of 130 mm.

The disk rotational speed was 1,800 rpm and the recording frequency was 3.7 MHz. A C/N ratio and noise level were measured at a position corresponding to a diameter of 60 mm (linear velocity 5.7 m/s). The results are shown in Table 2.

TABLE 2

| 130 mm diameter disk, 1800 rpm | | |
|---|---|---|
| | Cyclic polyolefin | Polycarbonate |
| C/N (dB) | | |
| 60 mm diameter | 45.5 | 45.5 |
| Noise level (dB) | | |
| 60 mm diameter | −47.5 | −47.5 |

As seen from the data of Tables 1 and 2, the cyclic polyolefin substrates according to the invention manifest a significant C/N increase and noise level lowering whey they have a diameter of at least 200 mm and are rotated at a high speed of at least 1,800 rpm.

EXAMPLE 2

The same cyclic polyolefin blend as used in Example 1 was injection molded under the same conditions as in Example 1 to form a substrate having a diameter of 300 mm and a thickness of 1.2 mm, which is designated sample No. 1.

The substrate was measured for thermal softening point by means of a TMA under the conditions: a cylindrical needle having a diameter of 1 mm in cross section, an applied load of 5 grams, and a heating rate of 2° C./min. A profile representing the penetration of the loaded needle with rising temperature was measured and primary and secondary thermal softening points T1 and T2 were calculated therefrom. Table 3 reports T1 and T2 of the polyolefin substrate. A SEM image of the substrate also indicated the presence of a skin layer having a thickness of up to about 100 μm.

A recording layer containing a cyanine dye was coated on the substrate. The dye layer had a thickness of 1,400 Å in the groove and 900 Å on the land. Gold was sputtered on the recording layer to form a reflective layer having a thickness of 1,000 Å. Further, a UV-curable resin composition containing an oligoester acrylate was coated on the reflective layer and UV cured to form a protective layer. The protective layer had a pencil hardness of 2H and a thickness of 5 μm. There was completed an optical recording disk sample designated No. 1.

The disk sample was measured for sensitivity at a rotational speed of 1,800 rpm and a recording frequency of 8 MHz. The sensitivity was the recording power at which a maximum output signal was available. The results are shown in Table 3.

Sample No. 1 showed satisfactory C/N and jitter characteristic.

EXAMPLE 3

A substrate sample was prepared by the same procedure as in Example 1 except that the blend ratio of cyclic polyolefins was changed, and the blend was melted at 360° C. and injection molded at a mold temperature of 100° C. and an injection pressure of 350 kg/cm$^2$. Using this substrate, a disk sample designated No. 2 was prepared by the same procedure as in Example 2. The disk sample was measured for sensitivity, with the result shown in Table 3. Sample No. 2 showed satisfactory C/N and jitter characteristic.

COMPARATIVE EXAMPLE 1

A substrate sample was prepared by the same procedure as in Example 1 except that the blend ratio of cyclic polyolefins was changed, and the blend was melted at 370° C. and injection molded at a mold temperature of 110° C. and an injection pressure of 350 kg/cm$^2$. Using this substrate, a disk sample designated No. 3 was prepared by the same procedure as in Example 2. The disk sample was measured for sensitivity, with the result shown in Table 3.

TABLE 3

| Sample No. | Thermal softening point (°C.) | | Sensitivity (recording power/mW) |
|---|---|---|---|
| | T1 | T2 | |
| 1 (Invention) | 131 | 163 | 11 |
| 2 (Invention) | 133 | 165 | 12 |
| 3 (Comparison) | 145 | 164 | 15 |

EXAMPLE 4

On the same substrate as used in Example 1 (substrate sample No. 1 in Example 2), a protective layer of glass was deposited by RF magnetron sputtering to a thickness of 40 nm. On the protective layer, an intermediate layer of SiNx was deposited by RF magnetron sputtering to a thickness of 80 nm. On the intermediate layer, a recording layer of Tb23Fe72Co5 was deposited by sputtering to a thickness of 80 nm. On the recording layer, another protective layer of the same composition as the first one was deposited by RF magnetron sputtering to a thickness of 100 nm. On the protective layer, a protective coat was formed by applying a UV curable resin containing an oligoester acrylate followed by UV curing to a thickness of 5 μm. There was completed an optical recording disk designated sample No. 4.

Sample No. 4 was subjected to an adhesion test according to the scribed adhesion test procedure of JIS K-5400. Eleven parallel cuts were scribed in the sample (reaching the recording layer) at a spacing of 1 mm in each of perpendicular directions by means of a cutter knife, defining 100 scribed sections per square centimeter. Adhesive tape (manufactured by Nichiban K.K.) was applied to the scribed surface and then peeled off. The number of separated sections was counted.

Sample No. 4 was allowed to stand for 1,000 hours in a hot humid atmosphere at a temperature of 80° C. and a relative humidity of 80%. It was also subjected to the adhesion test for comparison.

The results are shown in Table 4.

EXAMPLE 5

A disk sample, designated No. 5, was prepared by the same procedure as in Example 4 except that substrate sample No. 2 in Example 3 was used. The results are shown in Table 4.

COMPARATIVE EXAMPLE 2

A disk sample, designated No. 6, was prepared by the same procedure as in Example 4 except that substrate sample No. 3 in Comparative Example 1 was used. The results are shown in Table 4.

TABLE 4

| Sample No. | Thermal softening point (°C.) | | Scribed adhesion test | |
|---|---|---|---|---|
| | T1 | T2 | Fresh | 80° C./RH 85%/ 1000 hr. |
| 4 (Invention) | 131 | 163 | 100/100 | 100/100 |
| 5 (Invention) | 133 | 165 | 100/100 | 100/100 |
| 6 (Comparison) | 145 | 164 | 70/100 | 30/100 |

It will be understood that under the heading "Scribed adhesion test", 100/100 means that among 100 sections, all the 100 sections remained intact (not separated). As is evident from Table 4, sample Nos. 4 and 5 falling within the scope of the invention are improved in adhesion over sample No 6.

EXAMPLE 6

Two copolymers having different ethylene molar fractions were obtained by random polymerizing ethylene and tetracyclo[4,4,0,1$^{2,5}$,1$^{7,10}$]-3-dodecene (abbreviated as DMON) in accordance with the disclosure of JP-A 168708/1985. They were blended to form a blend having a softening point (T2) of 163° C. as measured by TMA. The blend was melted at 350° C. and injection molded at a mold temperature of 100° C. and an injection pressure of 350 kg/cm$^2$ to form a substrate having a diameter of 300 mm and a thickness of 1.2 mm. The substrate had a spiral tracking groove on the surface.

On the substrate, a protective layer of glass was deposited by RF magnetron sputtering to a thickness of 40 nm. On the protective layer, an intermediate layer of SiNx was deposited by RF magnetron sputtering to a thickness of 80 nm. On the intermediate layer, a recording layer of Tb23Fe72Co5 was deposited by sputtering to a thickness of 80 nm. On the recording layer, another protective layer of the same composition as the first one was deposited by RF magnetron sputtering to a thickness of 100 nm. On the protective layer, a protective coat was formed by applying a UV curable resin containing an oligoester acrylate followed by UV curing to a thickness of 5 μm. A protective substrate of glass was attached to the protective coat through an adhesive, completing a magneto-optical recording disk of the single side recording type as shown in FIG. 4.

The protective substrate was a disk of chemically tempered aluminosilicate glass having an outer diameter of 300 mm and a thickness of 1.2 mm. The adhesive was a hot-melt adhesive based on a pinene resin which was applied by means of a roll coater to a thickness of 80 μm.

Separately, a comparative magneto-optical recording disk was similarly fabricated using a substrate formed by injection molding bisphenol-A type polycarbonate (number average molecular weight 15,000) under optimum conditions, i.e., a melt temperature of 340° C., a mold temperature of 100° C., and an injection pressure of 300 kg/cm$^2$.

These magneto-optical recording disks were measured for instantaneous runout acceleration. Using a mechanical precision tester, the disk was measured for runout acceleration at intervals of 5 mm over an annular region of radially extending from 30 to 60 mm from the disk center while rotating the disk at 1,800 rpm. The atmosphere was at a temperature of 80° C. and a relative humidity of 80%. Three samples were used for each magneto-optical recording disk and an average of maximum runout accelerations was determined.

The runout acceleration is expressed by the acceleration of an optical pickup during focusing servo, representing the degree of flatness of the disk substrate having tracking grooves formed therein. It is recommended according to the ISO standard that the runout acceleration be up to 20 m/s$^2$, especially up to 10 m/s$^2$ for magneto-optical recording disks having an outer diameter of 130 mm.

The inventive sample using a cyclic polyolefin substrate showed an instantaneous runout acceleration of 20 m/s$^2$, which was a significant improvement over 55 m/s$^2$ for the comparative sample using a polycarbonate substrate.

EXAMPLE 7

The same cyclic polyolefin blend as used in Example 6 was injection molded under the same conditions as in Example 6 to form a substrate having a diameter of 300 mm and a thickness of 1.2 mm, which is designated sample No. 11.

The substrate was measured for thermal softening point by means of a TMA under the conditions: a cylindrical needle having a diameter of 1 mm in cross section, an applied load of 5 grams, and a heating rate of 2° C./min. A profile representing the penetration of the loaded needle with rising temperature was measured and primary and secondary thermal softening points T1 and T2 were calculated therefrom. Table 3 reports T1 and T2 of the polyolefin substrate. A SEM image of the substrate also indicated the presence of a skin layer having a thickness of up to about 100 μm.

A recording layer containing a cyanine dye was coated on the substrate. The dye layer had a thickness of 1,400 Å in the groove and 900 Å on the land. Gold was sputtered on the recording layer to form a reflective layer having a thickness of 1,000 Å. Further, a UV-curable resin composition containing an oligoester acrylate was coated on the reflective layer and UV cured to form a protective layer. The protective layer had a pencil hardness of 2H and a thickness of 5 μm. A protective substrate of glass having a thickness of 1.2 mm was integrated with the cyclic polyolefin substrate by adhesively attaching the protective substrate to the protective layer as in Example 6. There was completed an optical recording disk sample designated No. 11.

The disk sample was measured for sensitivity at a rotational speed of 1,800 rpm and a recording frequency of 8 MHz.

Sample No. 11 showed satisfactory C/N and jitter characteristic.

EXAMPLE 8

A substrate sample was prepared by the same procedure as in Example 6 except that the blend ratio of cyclic polyolefins was changed, and the blend was melted at 360° C. and injection molded at a mold temperature of 100° C. and an injection pressure of 350 kg/cm². Using this substrate, a disk sample designated No. 12 was prepared by the same procedure as in Example 7. The disk sample was measured for sensitivity. Sample No. 13 showed satisfactory C/N and jitter characteristic.

COMPARATIVE EXAMPLE 3

A substrate sample was prepared by the same procedure as in Example 6 except that the blend ratio of cyclic polyolefins was changed, and the blend was melted at 370° C. and injection molded at a mold temperature of 110° C. and an injection pressure of 350 kg/cm². Using this substrate, a disk sample designated No. 13 was prepared by the same procedure as in Example 7. The disk sample was measured for sensitivity.

The softening point and sensitivity measurements of sample Nos. 11 to 13 are the same as those of sample Nos. 1 to 3 which are reported in Table 3.

The optical recording media in the first form have cyclic polyolefin base substrates of a larger diameter and are adapted for high speed rotation with the benefits of a high output, high C/N, and low noise level.

The optical recording disks in the second form have cyclic polyolefin base substrates which experience minimized runouts so that fewer focus tracking errors occur during high rotational speed operation.

In either form, the presence of a desired skin layer in the substrate contributes to increased recording sensitivity and the improved adhesion between the recording layer and the substrate which leads to durability.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. An optical recording medium comprising a recording layer on a substrate having a diameter of at least 200 mm, wherein recording/reproducing operation is performed while rotating the medium at 1,800 rpm or higher, said substrate including a skin layer having a thermal softening point of 100 to 140 degrees C under the surface thereof bearing the recording layer, said substrate having the thermal softening point of the skin layer and a secondary thermal softening point higher by at least 10 degree C than the skin layer thermal softening point, said substrate being formed of a resin composition comprising at least one cyclic polyolefin obtained by copolymerizing ethylene with a cyclic olefin of the general formula:

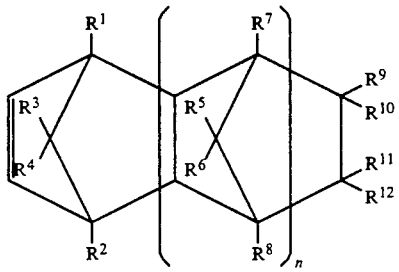

wherein n is 0 or a positive integer, $R^1$ through $R^{12}$ are independently selected from the group consisting of a hydrogen atom, halogen atom, and hydrocarbon group, and $R^9$ through $R^{12}$, taken together, may form a mono- or polycyclic group which may have a double bond, or $R^9$ and $R^{10}$ or $R^{11}$ and $R^{12}$ may form an alkylidene group.

2. The optical recording medium of claim 1 wherein said recording layer contains a dye, and said medium further includes a reflective layer on said recording layer.

3. The optical recording medium of claim 1 wherein said recording layer is formed directly on said substrate by a vapor phase deposition method.

4. The optical recording medium of claim 1 which further includes an undercoat layer between said substrate and said recording layer, wherein said recording and undercoat layers each are formed by a vapor phase deposition method.

5. An optical recording disk comprising a pair of resin and glass substrates, the resin substrate having a recording layer thereon and the glass substrate serving as a protective substrate, wherein said pair of substrates are joined into an integral disk such that the recording layer is inside, said resin substrate includes a skin layer having a thermal softening point of 100 to 140 degrees C under the surface thereof bearing the recording layer and wherein said resin substrate has the thermal softening point of the skin layer and a secondary thermal softening point higher by at least 10 degrees C than the skin layer thermal softening point, said resin substrate being formed of a resin composition comprising at least one cyclic polyolefin obtained by copolymerizing ethylene with a cyclic olefin of the general formula:

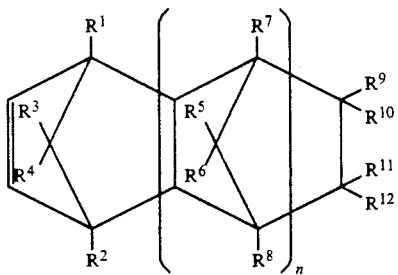

wherein n is 0 or a positive integer, $R^1$ through $R^{12}$ are independently selected from the group consisting of a hydrogen atom, halogen atom, and hydrocarbon group, and $R^9$ through $R^{12}$, taken together, may form a mono- or polycyclic group which may have a double bond, or $R^9$ and $R^{10}$ or $R^{11}$ and $R^{12}$ may form an alkylidene group.

6. The optical recording disk of claim 5 wherein recording/reproducing operation is performed while rotating the disk at 1,800 rpm or higher.

7. The optical recording disk of claim 5 wherein said recording layer contains a dye, and said disk further includes a reflective layer on said recording layer.

8. The optical recording disk of claim 5 wherein said recording layer is formed directly on said resin substrate by a vapor phase deposition method.

9. The optical recording disk of claim 5 wherein said resin substrate is formed by injectionmolding the resin composition.

10. The optical recording disk of claim 5, further comprising an undecoat layer between said resin substrate and said recording layer, wherein said recording and undercoat layers are formed by a vapor phase deposition method.

* * * * *